US007689549B2

(12) United States Patent
Krishnamurthy et al.

(10) Patent No.: US 7,689,549 B2
(45) Date of Patent: Mar. 30, 2010

(54) FLASHBACK SUPPORT FOR DOMAIN INDEX QUERIES

(75) Inventors: Sriram Krishnamurthy, Foster City, CA (US); Adiel Yoaz, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 250 days.

(21) Appl. No.: 11/544,790

(22) Filed: Oct. 5, 2006

(65) Prior Publication Data

US 2007/0198615 A1 Aug. 23, 2007

(51) Int. Cl.
*G06F 17/30* (2006.01)

(52) U.S. Cl. .................. 707/3; 707/1; 707/2; 707/100; 707/200; 707/203

(58) Field of Classification Search ................. 707/1–4, 707/10, 100–102, 200, 202, 203
See application file for complete search history.

(56) References Cited

U.S. PATENT DOCUMENTS

| | | | |
|---|---|---|---|
| 5,452,445 A | | 9/1995 | Hallmark et al. |
| 5,996,088 A | * | 11/1999 | Frank et al. ..................... 714/6 |
| 6,360,228 B1 | * | 3/2002 | Sundara et al. ............. 707/102 |
| 6,714,943 B1 | | 3/2004 | Ganesh et al. |
| 6,728,719 B1 | | 4/2004 | Ganesh et al. |
| 6,983,286 B1 | * | 1/2006 | Sinha et al. .................. 707/102 |
| 7,031,956 B1 | | 4/2006 | Lee et al. |
| 7,398,422 B2 | * | 7/2008 | Amano et al. .................. 714/19 |
| 2004/0148278 A1 | | 7/2004 | Milo et al. |
| 2004/0225865 A1 | * | 11/2004 | Cox et al. ...................... 712/34 |
| 2004/0267760 A1 | | 12/2004 | Brundage et al. |
| 2005/0289125 A1 | | 12/2005 | Liu et al. |

* cited by examiner

*Primary Examiner*—Cam-Linh Nguyen
(74) *Attorney, Agent, or Firm*—Hickman Palermo Truong & Becker LLP (57) ABSTRACT

Techniques for executing flashback queries using domain indexes in a database system are provided. In one technique, a flashback parameter of the flashback query is not included in a call-out invocation of domain index routines that implement a domain index. A call-back query execution unit nonetheless retrieves, for call-back queries issued by the domain index routines, call-back query results that reflect the state of a database in the database system as of the time specified in the flashback parameter. In another technique, a call-out invocation of domain index routines includes the flashback parameter of a flashback query. The domain index routines issue call-back queries that require the retrieval of data which reflects the state of a database as of the time specified in the flashback parameter, which are executed by the call-back query execution unit.

14 Claims, 5 Drawing Sheets

AN APPROACH TO PASS-AROUND EMBODIMENT

Components of a database system configured for
PASS-AROUND embodiment in one approach

FIG. 1 AN APPROACH TO PASS-AROUND EMBODIMENT

Components of a database system configured for
PASS-AROUND embodiment in one approach

FIG. 3 PASS-THROUGH EMBODIMENT

|  | rowid | age |
|---|---|---|
|  | R1 | 7 |
| (Current) T2 | R2 | 2 |
|  | R3 | 10 |

|  | rowid | age |
|---|---|---|
|  | R1 | 3 |
| (Prior) T1 | R2 | 5 |
|  | R3 | 9 |

FLASHBACK SUPPORT FOR DOMAIN INDEX QUERIES

RELATED APPLICATION

This application is related to U.S. Pat. No. 5,893,104, entitled Extensible Indexing, filed on Jul. 9, 1996, by Jagannathan Srinivasan, Ravi Murthy, Chin Hong, Samuel DeFazio, and Anil Nori, the contents of which are herein incorporated by reference in their entirety for all purposes.

This application is related to U.S. patent application Ser. No. 10/427,511, entitled Flashback Database, filed on Apr. 30, 2003, by J. William Lee, Juan Loaiza, Michael J. Stewart, Wei-ming Hu, William H. Bridge, Jr, the contents of which are herein incorporated by reference in their entirety for all purposes.

This application is related to U.S. Pat. No. 6,631,374, entitled System and Method for Providing Fine-Grained Temporal Database Access, filed on Sep. 29, 2000, by Klein et al., the contents of which are herein incorporated by reference in their entirety for all purposes.

FIELD OF THE INVENTION

The present invention relates to data management systems and, in particular, to a method of retrieving data from a prior point in time using domain indexes.

BACKGROUND OF THE INVENTION

Domain Indexes

"Domain indexes" are indexes that are not natively supported by a database system. One technique for using domain indexes in a database system is described in Extensible Indexing, which is referenced above. Using the techniques described in Extensible Indexing, user-implemented routines for maintaining and using domain indexes are registered with a database system. Such routines are referred to herein as "domain index routines".

Once domain index routines have been registered with the database system, the database system is able to invoke the domain index routines as necessary to perform more efficient query processing. Specifically, in response to requests from a client, the database server interacts with the domain index routines to build, maintain, and employ instances of the newly defined and registered domain index type. The instances of an index type are known as index objects, and contain an index key and may contain, for each index key, an associated data segment managed by the index routines. In some implementations, the data segment may be data from a row in a table associated with the index key.

When a database system receives queries that reference a table on which a domain index has been created, an optimizer within the database system determines whether to make use of domain index to process the query. If the optimizer determines that a domain index is to be used in processing the query, then the database server can invoke the domain index routines for that index type. Queries that are processed using domain indexes are referred to herein as "domain index queries".

The invocation of a domain index routine is referred to herein as a call-out, since the domain index routine code is not built-in to the database server. According to an approach described in Extensible Indexing, the call-outs are invocations of routines that retrieve data using existing index objects. These routines include i_open, i_close, i_start, and i_fetch.

When invoked, the domain index routines perform actions dictated by the logic internal to the domain index routines. During the execution of this logic, the routines may issue one or more queries back to the database system. Queries that are issued by the domain index routines back to the database system are referred to herein as "call-back queries". In one approach, the call-back queries may be SQL queries.

Within the database system, a call-back query execution unit receives the call-back queries, executes the call-back queries, and returns data that satisfy the conditions of the call-back queries. The data returned by the call-back query execution unit is referred to herein as the "call-back response data". The call-back response data typically contains identifiers identifying records in the database. The identifiers may, for example, be row identifiers (rowids) that identify rows, within relational tables managed by the database system, that satisfy the selection criteria of the call-back queries.

A domain index routine that issues a call-back receives the call-back response data, performs some steps internally according to its internal logic, and returns information to the database server routine that invoked the domain index routine. The information returned by the domain index routine is referred to herein as "call-out response data". Typically, the call-out response data is largely based on the call-back response data. Similar to the call-back response data, the call-out response data often contains the rowids of rows, within the database, that satisfy certain criteria.

The database server receives the call-out response data, and uses the call-out response data to perform whatever additional processing is required by the query that was received by the database system. That additional processing may involve, for example, sorting rows or performing joins between rows from different tables.

Flashback Queries

Techniques have also been developed that allow users to submit queries that specify retrieval of data as of prior points in time. Those queries are referred to herein as flashback queries. One way to implement flashback queries is described in System and Method for Providing Fine-Grained Temporal Database Access, cited above.

Modifications to the SQL language allow the client to express the desired prior point in time in a flashback query, herein known as the flashback time. The SQL query language is modified to include "AS OF" to indicate that a query uses flashback. A System Change Number (SCN) or timestamp may be used to specify the flashback time. In the examples below, both queries look for rows that satisfy the predicate "WHERE eq(name, 'Fred')=1" as of the prior point in time stated in the query.

EXAMPLE 1

SELECT*FROM table AS OF SCN scn WHERE eq(name, 'Fred')=1

Here, scn represents the SCN corresponding to the desired prior point in time, and is known as the flashback parameter.

Alternatively, the query may use "AS OF TIMESTAMP ts."

EXAMPLE 2

SELECT*FROM table AS OF TIMESTAMP ts WHERE eq(name, 'Fred')=1

Here, ts represents the timestamp corresponding to the desired prior point in time, and is also known as the flashback parameter.

The database system responds to flashback queries by retrieving data that reflects the state of the database as of the specific point in time identified by the flashback parameter in the flashback queries.

Flashback Queries and Domain Indexes

In the past, database systems did not provide domain index support for flashback queries. Domain indexes could not be used with flashback queries because the call-back queries issued by domain index routines are not executed as flashback queries. Consequently, data retrieved by call-back query execution units and returned to domain index routines reflects the state of the database as of the time the call-back query is executed, rather than reflecting the state of the database as of the time specified in the flashback query. Since the information coming into the domain index routines does not reflect the time specified in the flashback query, any results returned by the domain index routines will also not reflect the time specified in the flashback query.

Thus, the database server would receive from the domain index routines call-out response data that reflects the state of the database from a time other than the time specified in the flashback query. The database server would then perform the remaining steps of query processing using the call-out response data that reflects the state of the database from the wrong time. The final query result returned to the client would be incorrect, since the query result is not produced from data that represents the state of the database for the time specifically requested by the client.

Figure 5:
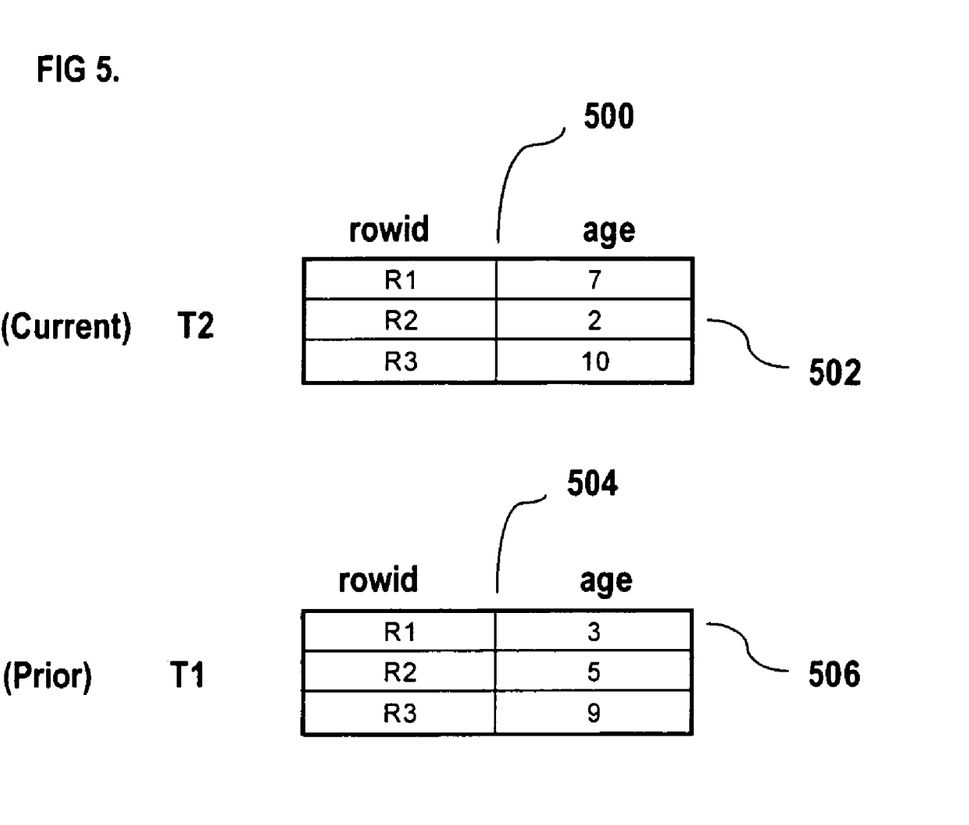
FIG. 5 illustrates a database table at a current time and from a prior time.

FIG. 5 is a block diagram that illustrates a table at two different points in time (T1 and T2). Assume that, at time T2, a client issues a flashback query to retrieve data as of time T1. Assume further that the flashback query selects information from rows where age is less than 4. If a domain index is used to process the query, then the call-back query execution unit may receive from the domain index routine a call-back query to retrieve the rowid of all rows where age is less than 4. However, the call-back query is not a flashback query. Consequently, the call-back query execution unit will execute the call-back query as of a different point in time (T2).

Executing the callback query as of time T2, the call-back query execution unit will return row R2 502 because at time T2 row R2 502 is the only row where age is less than 4. Consequently, R2 502 will be reflected in the callout response, even though row R1 506 would have been the correct row to return, given the state of the table at time T1.

Because flashback queries that accessed domain indexes did not return results that accurately reflected the flashback time, flashback queries had to be executed without making use of existing domain indexes. In some cases, because domain indexes could not be used, execution of flashback queries would result in full table scans, significantly slowing down query processing. Thus, there is a need for flashback support in processing queries that utilize domain indexes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques for supporting the use of flashback in conjunction with domain indexes are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided to allow flashback queries to work in conjunction with domain indexes. A database system that supports flashback queries with domain indexes includes an extensible infrastructure that calls the routines that implement domain indexes, and a call-back query execution unit, which may be part of the extensible infrastructure. The extensible infrastructure may be the portion of the database server within the database system which registers, manages and invokes call-outs to domain index routines.

When a database system receives a flashback query, an optimizer within the database system determines whether to make use of domain indexes to process the query. If the optimizer determines that a domain index is to be used in processing the flashback query, then the database server makes a call-out to the domain index routine. In one embodiment, referred to herein as the "PASS-AROUND" embodiment, the call-out does not include any information about the flashback time specified for the flashback query. In response to the call-out, one or more domain index routines are executed. The domain index routines issue call-back queries to the call-back query execution unit. However, before the call-back query execution unit executes the call-back queries, flashback information from the flashback query is communicated to the call-back query execution unit. The call-back query execution unit uses the flashback information to execute the call-back queries as of the specified flashback time. The results of the call-back queries thus reflect the flashback time, causing the domain index routines to return data that is accurate as of the flashback time.

In the PASS-AROUND embodiment, the fact that the call-back queries are being processed as of the flashback time is completely transparent to the domain index routines. According to another embodiment, referred to herein as the PASS-THROUGH embodiment, flashback information is passed to the call-back query execution unit through the domain index routines. For example, flashback information may be passed as a parameter to the domain index routines, which may simply pass the flashback information back out to the call-back execution unit with each call-back query. In the PASS-THROUGH embodiment, the domain index routines need not know the purpose or significance of the flashback information, but they do need to be designed to receive the flashback information from the database server and pass the flashback information back to the call-back query execution unit.

System Overview

Figure 1:
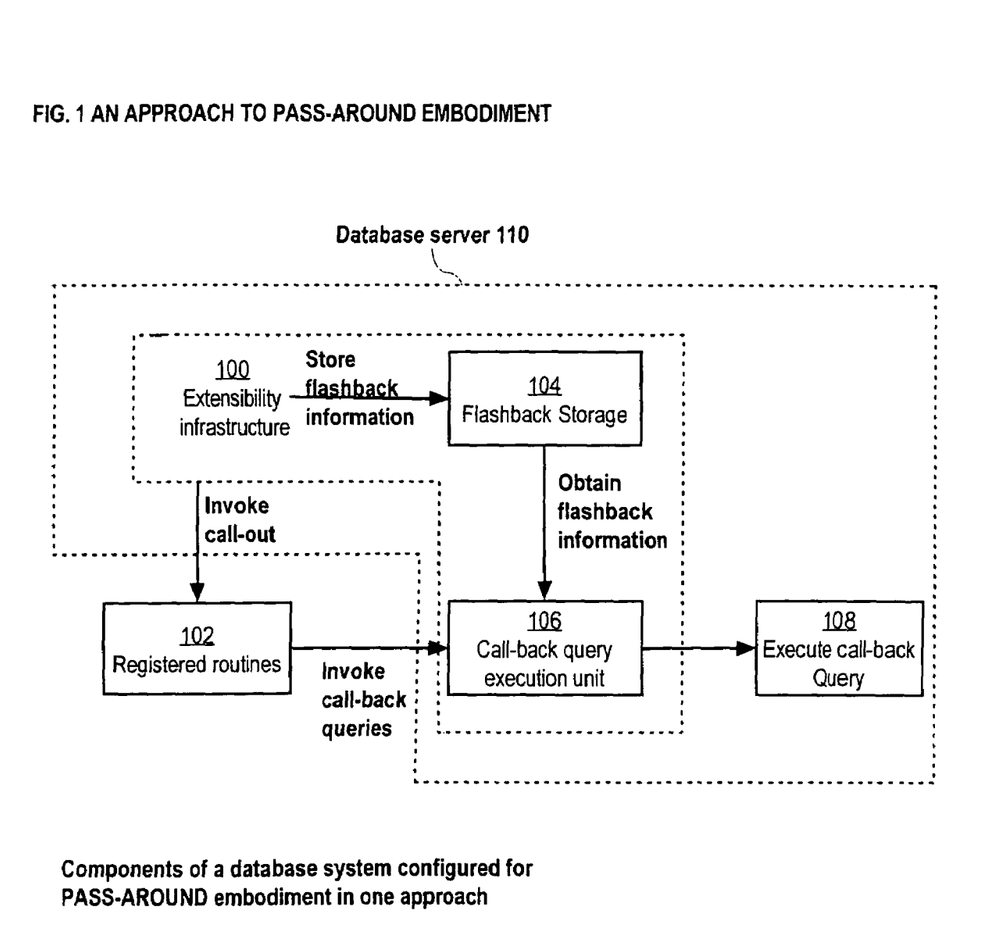
FIG. 1 is a block diagram illustrating the interactions and relationships between different components of a database system according to an embodiment of the present invention.

FIG. 1 is a block diagram illustrating the interactions and relationships between different components of a database system according to the PASS-AROUND embodiment. Referring to FIG. 1, the extensibility infrastructure 100, flashback storage 104, and call-back query execution unit 106 may be part of a database system configured for flashback support where domain indexes are utilized. The domain index routines are added as extensions to the database system through a registration process, as explained above.

Extensibility infrastructure 100 generally represents the portion of database server 110 that interacts with domain index routines 102. In the illustrated embodiment, the extensibility infrastructure 100 includes a mechanism for making call-outs to the domain index routines 102, and a query execution unit 106 for handling the call-backs from the domain index routines 102. In some implementations, the database server 110 includes memory allocated to store flashback information in a global variable (flashback storage 104). In other implementations, flashback storage 104 may be storage allocated for a function call argument.

When database server 110 is executing a flashback query, and the optimizer determines that the query should be executed using a domain index, extensibility infrastructure 100 invokes a call-out to one of the domain index routines 102. The domain index routine issues one or more call-back queries to the call-back query execution unit 106. In the approach of FIG. 1, extensibility infrastructure 100 also stores the flashback information from the flashback query in flashback storage 104. Prior to executing a call-back query, call-back query execution unit 106 obtains the flashback information, and executes the call-back query 108 as a flashback query as of the time indicated in the flashback information. The results of the call-back queries are returned to the domain index routines, and the domain index routines return results to the domain index infrastructure. The remaining query processing steps are performed when the database system receives the retrieved results from the call-out invocation.

Pass-Around

According to a PASS-AROUND embodiment of the invention, no flashback information is received by the domain index routine. In response to receiving from a client a flashback query that requires the use of a domain index, the database server makes a call-out to the domain index routines for that user-implemented index. The call-out may not include any flashback information. The domain index routines may issue one or more call-back queries to the database system.

The call-back query execution unit receives the call-back queries. In one approach, the call-back query execution unit modifies the call-back queries to produce flashback call-back queries, by using the flashback information from the flashback query. The call-back query execution unit executes the flashback call-back queries, and returns the results to the domain index routines. The domain index routines receive the returned results, but are completely unaware that the returned results reflect the state of the database as of the flashback time. Upon receiving the call-back query results, the domain index routines will typically perform some internal processing, and return call-out response data to the database server routine that made the call-out. After receiving the call-out response data, the database system may use this data to perform the remainder of query processing. The data returned by the callout is index data which is typically used to look up the actual data requested by the query.

Some examples of a PASS-AROUND embodiment include, but are not limited to, storing the flashback parameter in a global variable, or using a function wrapper around existing routines that implement domain indexes. One advantage of the PASS-AROUND embodiment is that no changes are required to the domain index routines to enable the domain index to support flashback queries.

Figure 2:
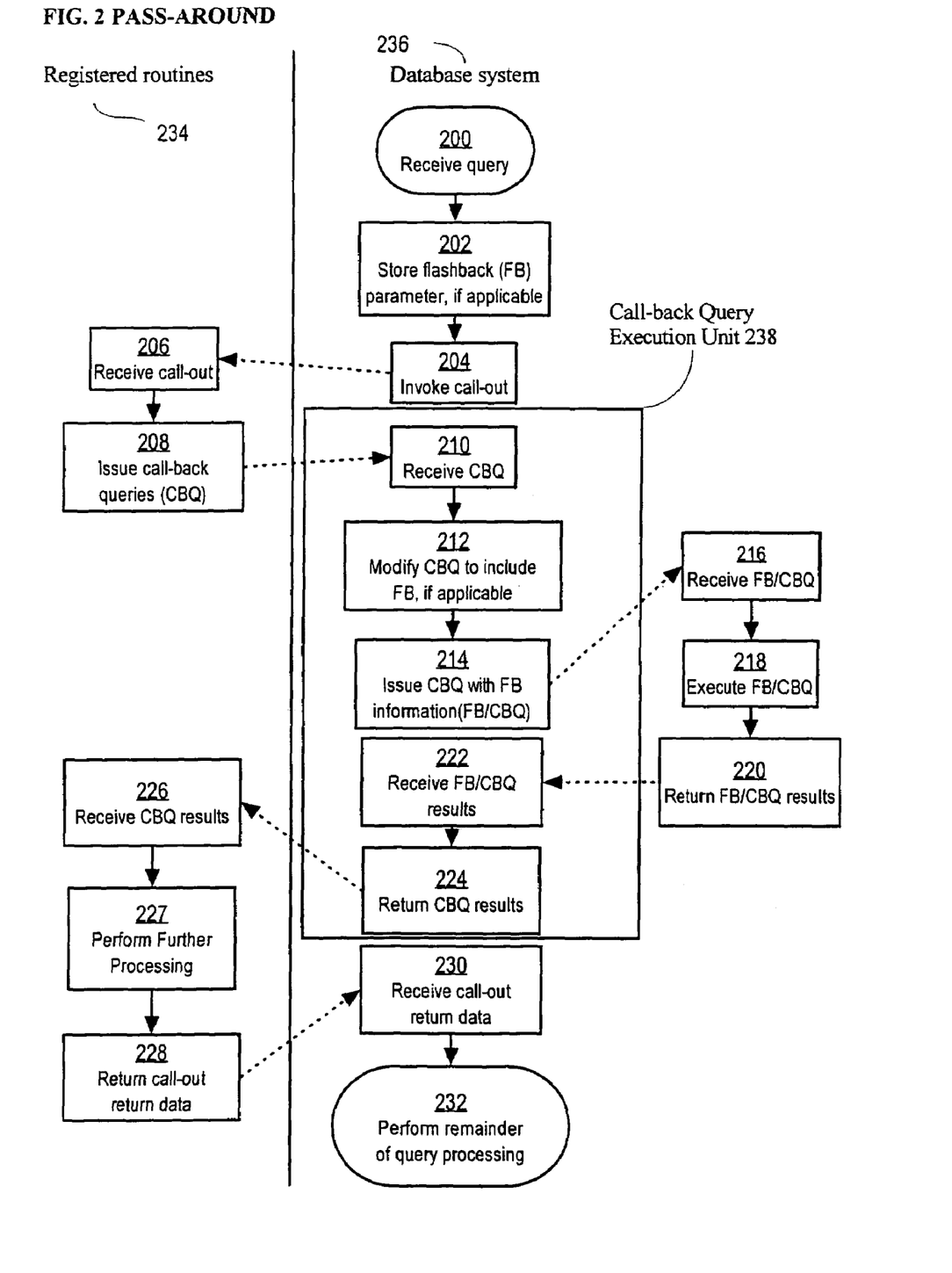
FIG. 2 is a flow diagram that illustrates the processing of flashback queries without passing flashback parameters to the domain index routines for the domain index, according to an embodiment of the invention.

FIG. 2 is a flowchart illustrating the steps taken in processing a flashback query using a domain index according to the PASS-AROUND embodiment. Database system 236 in FIG. 2 implicitly includes a database server that is not separately shown. Call-back query execution unit 238 is shown as a separate unit in FIG. 2 but is typically part of the extensibility infrastructure of database system 236, as illustrated in FIG. 1.

Database system 236 receives a flashback query (block 200) from some client (not shown). Database system 236 stores the flashback parameter of the flashback query (block 202). The database server in database system 236 invokes a call-out (block 204). The invocation of the call-out (block 204) is received by domain index routines 234 (block 206), which then issue call-back queries (block 208).

After receiving the call-back queries (block 210), call-back execution unit modifies the call-back queries to include flashback information (block 212). The call-back execution unit 238 issues the flashback call-back queries to the database system 236 (block 214). The database system 236 receives the flashback call-back queries (block 216), executes them as of the flashback time (block 218), and returns the call-back query results to the call-back query execution unit 238 (block 220).

Call-back query execution unit 238 receives the call-back response data (block 222), and returns the results (block 224) of the call-back queries to the domain index routines that issued the call-back queries.

Domain index routines 234, in turn, receive the results of the call-back queries (block 226), perform further processing (block 227), and return the call-out response data (block 228). Database system 236 receives the call-out response data (block 230), and performs the remainder of the query processing (block 232).

Pass-Through

According to one implementation of the PASS-THROUGH embodiment of the invention, the routines that implement a domain index receive flashback information, but do not act on the flashback information other than to pass the flashback information to the call-back query execution unit whenever the domain index routines issue call-back queries. The domain index routines are modified to accommodate the pass-through of the flashback information (e.g. by adding a flashback input parameter to the routines).

In response to the database server receiving a flashback query that requires the use of a domain index, the database server invokes a call-out to the domain index routines for that domain index. The call-out invocation passes to the domain index routines the flashback information.

The domain index routines may issue one or more call-back queries to the call-back query execution unit. In one approach, these call-back queries are requests for data that reflects the state of the database as of the time specified in the flashback parameter specified by the client in the flashback query.

A call-back query execution unit receives both the call-back queries and flashback information from the domain index routines. The call-back query execution unit uses the flashback information to retrieve query results for the call-back queries that reflect the state of the database as of the time specified by the flashback information. The domain index routines receive the results for the call-back queries, perform some internal processing, and return call-out response data to the client. The call-out response data reflects the state of the database as of the time specified in the flashback parameter.

Examples of this PASS-THROUGH embodiment include, but are not limited to, where the flashback information is included as an argument in a function call to the domain index routines, or where the flashback information may be included as part of a query associated with the call-out.

Figure 3:
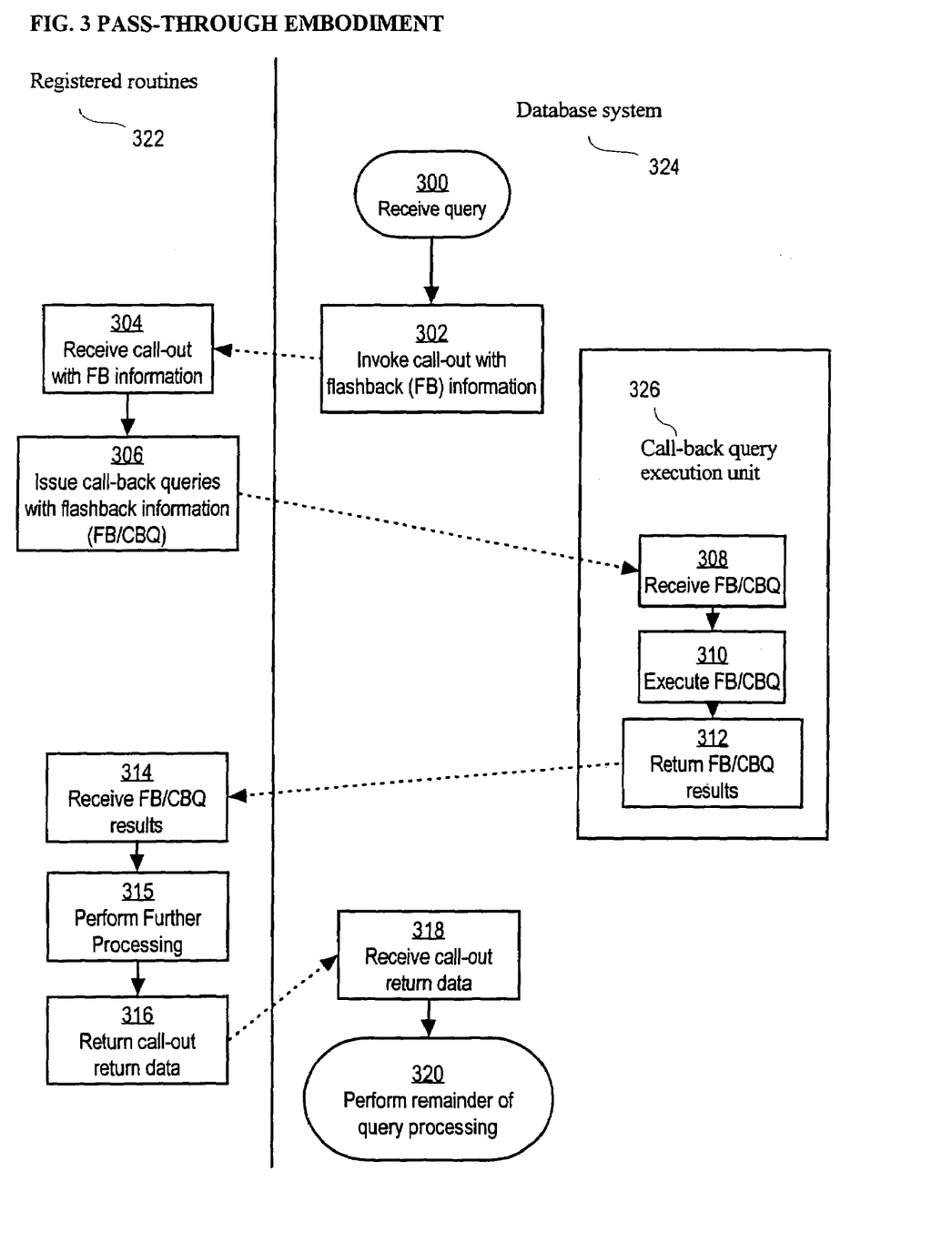
FIG. 3 is a flow diagram that illustrates the processing of flashback queries with the passing of flashback parameters to the routines of the domain index, according to an embodiment of invention.

FIG. 3 is a flowchart illustrating the steps taken in processing a flashback query using a domain index according to the PASS-THROUGH embodiment. Database system 324 in FIG. 3 implicitly includes a database server that is not separately shown. Call-back query execution unit 326 is shown as part of database system 324, but may be a separate unit in some implementations.

Database system 324 receives a flashback query (block 300) from some client (not shown), and the database server in database system 324 invokes a call-out (block 302). Domain index routines 322 receive the call-out (block 304) and issue call-back queries with the passing of flashback information (block 306). Call-back query execution unit 326 receives the call-back queries along with the flashback information (block 308), causes the database server to execute the call-back queries (block 310), and returns the results of the call-back queries (block 312). Domain index routines 322 receive the results of the call-back queries (block 314), perform further processing (block 315), and return the call-out response data (block 316). Database server 324 receives the call-out response data (block 318), and performs the remainder of the query processing (block 320). Because the call-back queries are executed based on the flashback time, the call-out response will be accurate as of the flashback time.

Hardware Overview

Figure 4:
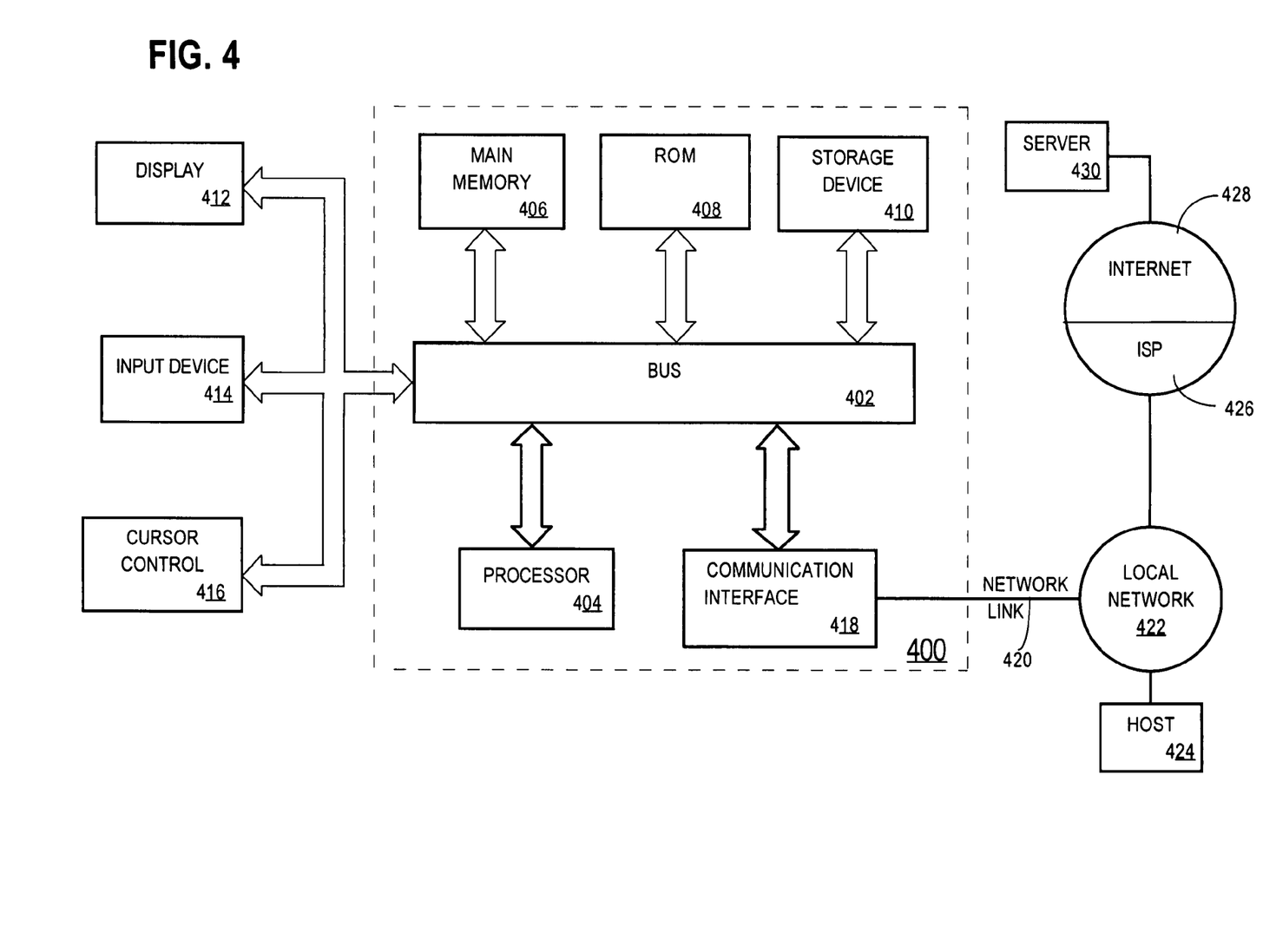
FIG. 4 is a block diagram that illustrates a computer system 400 upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of processing a flashback query to return data from a prior target logical state of a database system, the method comprising the steps of:

receiving, at said database system, said flashback query, wherein a response to the flashback query requires said database system to retrieve said data from said prior target logical state of said database system, where the prior target logical state corresponds to a target time; and in response to receiving said flashback query, computing said flashback query using an index structure that is not natively supported by said database system to retrieve said data, wherein said data that is retrieved using said index structure accurately reflects said prior target logical state of said database system, but does not reflect a different logical state of said database system that exists after said target logical state;

wherein the method is performed by one or more computing devices.

2. The method of claim 1, wherein the method further includes registering with the database system user-implemented routines for using the index structure.

3. The method of claim 2, further including:

in response to receiving said flashback query, storing target time data that indicates said prior target logical state;

wherein the step of using an index structure includes making a call to at least one of said user-implemented routines without passing any information identifying said target point in time;

in response to said call, receiving from at least one of said user-implemented routines one or more second queries; and using the target time data to execute the one or more second queries to retrieve further data that reflects said prior target logical state.

4. The method of claim 3, wherein:

the method further includes storing the stored target time data in a variable;

the step of using the target time to execute the one or more second queries is performed by a call-back execution unit; and the call-back execution unit obtains said stored target time data from said variable.

5. The method of claim 3, wherein the step of using the target time data to execute the one or more second queries further comprises the step of rewriting said one or more second queries to retrieve said further data that reflects said prior target logical state of said database system.

6. The method of claim 2, wherein using the index structure includes:

making a call to at least one of said user-implemented routines, wherein said call passes information identifying said target time;

in response to said call, receiving from at least one of said user-implemented routines (a) one or more second queries that request retrieval of data, and (b) data that reflects said target time.

7. The method of claim 6, further comprising the step of executing the one or more second queries to retrieve further data that reflects said target logical state of said database system.

8. A computer-readable storage medium carrying one or more sequences of instructions for processing a flashback query to return data from a prior target logical state of a database system, which instructions, when executed by one or more processors, causes the one or more processors to perform:

receiving, at said database system, said flashback query, wherein a response to the flashback query requires said database system to retrieve said data from said prior target logical state of said database system, where the prior target logical state corresponds to a target time; and in response to receiving said flashback query, computing said flashback query using an index structure that is not natively supported by said database system to retrieve said data, wherein said data that is retrieved using said index structure accurately reflects said prior target logical state of said database system, but does not reflect a different logical state of said database system that exists after said target logical state.

9. The computer-readable storage medium of claim 8, wherein the instructions further include instructions for registering with the database system user-implemented routines for using the index structure.

10. The computer-readable storage medium of claim 9, wherein the instructions further include instructions for:

in response to receiving said flashback query, storing target time data that indicates said prior target logical state;

wherein the step of using an index structure includes making a call to at least one of said user-implemented routines without passing any information identifying said target point in time;

in response to said call, receiving from at least one of said user-implemented routines one or more second queries; and using the target time data to execute the one or more second queries to retrieve further data that reflects said prior target logical state.

11. The computer-readable storage medium of claim 10, wherein the instructions further include instructions for:

storing the stored target time data in a variable;

wherein the step of using the target time to execute the one or more second queries is performed by a call-back execution unit; and wherein the call-back execution unit obtains said stored target time data from said variable.

12. The computer-readable storage medium of claim 10, wherein the step of using the target time data to execute the one or more second queries further comprises the step of rewriting said one or more second queries to retrieve said further data that reflects said prior target logical state of said database system.

13. The computer-readable storage medium of claim 9, wherein using the index structure includes:

making a call to at least one of said user-implemented routines, wherein said call passes information identifying said target time;

in response to said call, receiving from at least one of said user-implemented routines (a) one or more second queries that request retrieval of data, and (b) data that reflects said target time.

14. The computer-readable storage medium of claim 13, wherein the instructions further comprise carrying instructions for executing the one or more second queries to retrieve further data that reflects said target logical state of said database system.

* * * * *